(12) United States Patent
Acharya et al.

(10) Patent No.: US 7,966,655 B2
(45) Date of Patent: Jun. 21, 2011

(54) METHOD AND APPARATUS FOR OPTIMIZING A FIREWALL

(75) Inventors: Subrata Acharya, Pittsburgh, PA (US); Zihui Ge, Secaucus, NJ (US); Albert Gordon Greenberg, Summit, NJ (US); Jia Wang, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 950 days.

(21) Appl. No.: 11/478,829

(22) Filed: Jun. 30, 2006

(65) Prior Publication Data

US 2008/0005795 A1    Jan. 3, 2008

(51) Int. Cl.
*H04L 29/00* (2006.01)
(52) U.S. Cl. ........................................................ 726/11
(58) Field of Classification Search ...................... 726/11
See application file for complete search history.

(56) References Cited

U.S. PATENT DOCUMENTS

| | | | | |
|---|---|---|---|---|
| 6,154,775 A | * | 11/2000 | Coss et al. | 709/225 |
| 6,253,321 B1 | * | 6/2001 | Nikander et al. | 713/160 |
| 6,854,063 B1 | | 2/2005 | Qu et al. | |
| 7,061,874 B2 | * | 6/2006 | Merugu et al. | 370/255 |
| 2002/0107953 A1 | | 8/2002 | Ontiveros et al. | |
| 2002/0133586 A1 | * | 9/2002 | Shanklin et al. | 709/224 |
| 2003/0051165 A1 | * | 3/2003 | Krishnan et al. | 713/201 |
| 2004/0205360 A1 | * | 10/2004 | Norton et al. | 713/201 |
| 2006/0248580 A1 | * | 11/2006 | Fulp et al. | 726/11 |

OTHER PUBLICATIONS

Archarya, S., et al., "Simulation Study of Firewalls to Aid Improved Performance", Proc. 39th Annual Sim. Symp., 2006.
Archarya, S., et al., "Traffic-Aware Firewall Optimization Strategies", Proc. IEEE Int'l. Conf. Comm., 2006.
Hamed, H., et al., "Dynamic Rule-ordering Optimization for High-speed Firewall Filtering", ASIACCA, 2006.
PCT International Search Report corresponding to PCT Patent Application PCT/US2007/014392 filed Jun. 19, 2007.
PCT Written Opinion of the International Searching Authority corresponding to PCT Patent Application PCT/US 2007/014392 filed Jun. 19, 2007.
Roughan, M. et al., "Experience in Measuring Backbone Traffic Variability: Models, Metrics, Measurements and Meaning", Proc. of the 2nd Association for Computing Machinery (ACM), Special Interest Group on Data Communication (SIGCOMM) Workshop on Internet Measurement, pp. 91-92, France, 2002.
Al-Shaer, E.,et al., "Modeling and Management of Firewall Policies", IEEE Trans. on Network and System Management, vol. 1, No. 1, pp. 1-10, 2004.
Eronen, P. et al., "An Expert System for Analyzing Firewall Rules", Proc. of the 6th Nordic Workshop on Secure IT Systems (NordSec 2001), pp. 100-107, Denmark, 2001.
Qian, J. et al., "ACLA: A Framework for Access Control List (ACL) Analysis and Optimization", Proc. of Communications and Multimedia Security, pp. 1-15, 2001.

* cited by examiner

*Primary Examiner* — Minh Dinh

(57) ABSTRACT

Disclosed is a method and system for optimizing a first set of rules enforced by a firewall on network traffic. Characteristics of the network traffic are examined and these characteristics are used to generate a second set of rules. The first set of rules may have a different order than the second set of rules.

24 Claims, 4 Drawing Sheets

| Rule | Src | Dst | Srv | Action |
|---|---|---|---|---|
| $R_1$ | $s_1, s_2, s_3$ | $d_1, d_2, d_3$ | $\sigma_1$ | drop |
| $R_2$ | $s_2, s_3, s_4$ | $d_2, d_3, d_4$ | $\sigma_1$ | accept |
| $R_3$ | $s_5$ | $d_4$ | $\sigma_1$ | accept |

510

| Rule | Src | Dst | Srv | Action |
|---|---|---|---|---|
| $R_1$ | $s_1, s_2, s_3$ | $d_1, d_2, d_3$ | $\sigma_1$ | drop |
| $R_2^1$ | $s_4$ | $d_2, d_3, d_4$ | $\sigma_1$ | accept |
| $R_2^2$ | $s_2, s_3$ | $d_4$ | $\sigma_1$ | accept |
| $R_3$ | $s_5$ | $d_4$ | $\sigma_1$ | accept |

| Rule | Src | Dst | Srv | Action |
|---|---|---|---|---|
| $R_1$ | $s_1, s_2, s_3$ | $d_1, d_2, d_3$ | $\sigma_1$ | drop |
| $R_2^1$ | $s_4$ | $d_2, d_3, d_4$ | $\sigma_1$ | accept |
| $R_4$ | $s_2, s_3, s_5$ | $d_4$ | $\sigma_1$ | accept |

METHOD AND APPARATUS FOR OPTIMIZING A FIREWALL

BACKGROUND OF THE INVENTION

The present invention relates generally to network security, and more specifically to optimizing firewalls.

A firewall is typically a combination of hardware and software used to implement a security policy governing the flow of network traffic between two or more networks. A firewall acts as a security barrier to control traffic and manage connections between internal and external network hosts. The ability of a firewall to centrally administer network security can also be extended to log incoming and outgoing traffic to allow accountability of user actions and to trigger alerts when unauthorized activities occur. The security provided by a firewall is typically defined by a set of rules.

The continuous growth of the Internet, coupled with the increasing sophistication of attacks, is placing stringent demands on firewall performance and on the complexity of firewall design and management. Increased firewall complexity often results in increased vulnerability and reduced availability of individual network services and applications. The protection that a firewall provides often becomes as good as not only the policies that the firewall is configured to implement but also the speed at which the firewall enforces these policies. Under attack or heavy load, firewalls can easily become a bottleneck. As the network bandwidth and processor speed continue to increase, the demand for optimizing firewall operations for improved performance also increases.

"Optimization" heuristics have been developed to make firewalls more efficient and dependable. Current techniques for firewall optimization, however, remain static. For example, once a firewall is configured and installed, the firewall is typically left alone. As a result, optimization techniques fail to adapt to the continuously varying dynamics of the network.

Thus, there remains a need to optimize firewalls in a more dynamic manner.

BRIEF SUMMARY OF THE INVENTION

Current techniques for firewall optimization are static due at least to their inability to take into account the traffic characteristics logged by the firewall, such as source and destination of received packets, service requests and the resulting action taken by the firewall in response to these requests.

In accordance with the present invention, a method and apparatus optimizes a first set of rules enforced by a firewall on network traffic. The method and apparatus examine characteristics of the network traffic and automatically generate a second set of rules based on this examination. The second set of rules are then enforced by the firewall.

A rule set based optimizer may remove redundancies from the first set of rules and may then generate a disjoint rule set from the first set of rules. In one embodiment, to generate a disjoint rule set, the rule set based optimizer removes dependencies from the first set of rules. The rule set based optimizer can create new rules and merge rules to generate a rule set based optimized set of rules.

The rule set based optimizer can then work with a traffic based optimizer to generate the optimized second set of rules. In particular, the traffic based optimizer can perform hot caching, total reordering, default proxy, and online adaptation on the rule set based optimized set of rules to generate the second set of rules. In one embodiment, the traffic based optimizer performs profile based reordering and/or anomaly detection and countermeasure on the rule set based optimized set of rules to generate the second set of rules. From this optimization, the second set of rules likely has a different order than the first set of rules.

These and other advantages of the invention will be apparent to those of ordinary skill in the art by reference to the following detailed description and the accompanying drawings.

BRIEF DESCRIPTION OF THE DRAWINGS

FIG. 5 is a table of a pre-optimized rule set and a table of a disjoint rule set in accordance with an embodiment of the invention; and FIG. 6 is a table of a final rule set in accordance with an embodiment of the invention.

DETAILED DESCRIPTION

Figure 1:
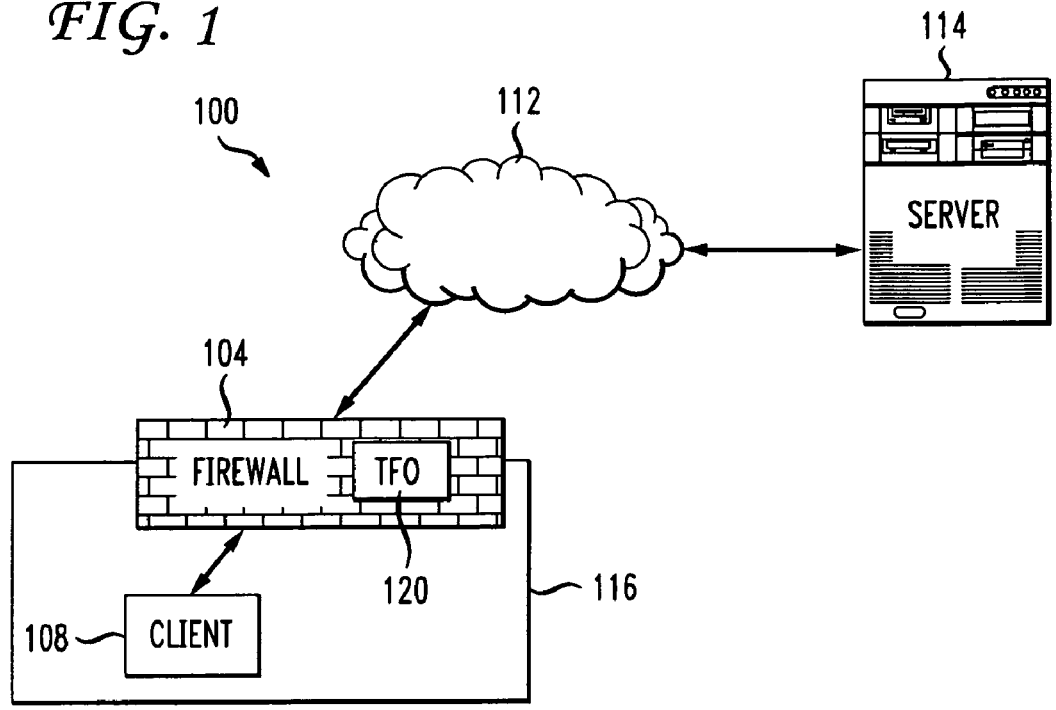
FIG. 1 is a block diagram of a system having a firewall with a traffic-aware firewall optimizer in accordance with an embodiment of the present invention.

FIG. 1 provides a block diagram of a system 100 having a firewall 104 and, in accordance with an aspect of the present invention, a traffic-aware firewall optimizer (TFO) 120. The firewall 104 intercepts all communications transmitted from and received by the client 108 over network 112. The firewall 104 also logs information about each connection that the client 108 makes with the network 112. The firewall 104 can be a hardware device, a software application or a combination of both. The firewall 104 is typically placed at the perimeter of a client network 116 (e.g., a local area network (LAN)) having client 108. The client network 116 may also have more than one client.

The firewall 104 enables a user to establish rules to determine what traffic should be allowed into or out of client network 116. Based on these rules, firewall 104 can prevent access to certain Internet Protocol (IP) addresses, domain names, or certain types of traffic by blocking particular TCP/IP ports. A firewall rule is conventionally a multi-dimensional structure, where each dimension is either a set of network fields (e.g., from a packet's header) or an action field. Examples of a network field include a source address, a destination address, a service type, a protocol number or a port number. An action field is the action taken by the firewall when a packet (i.e., information in the packet's header) matches a rule. An action field can be "accept", "deny", or some other action (e.g., redirect to a server that performs further processes, etc.).

Formally, a typical rule R can be represented as:

$$<src=\{s_1, s_2, \ldots, s_n\}; dst=\{d_1, d_2, \ldots, d_m\}; srv=\{\sigma_1, \sigma_2, \ldots, \sigma_l\}; action=\{drop\}>,$$

where src represents the source, $s_i$ represents a source IP address, dst represents destination, $d_i$ a destination IP address, srv represents service, and $\sigma_i$ a service type.

A list-based firewall is a firewall having rules describing network security policies forming a "priority" list. In list-based firewalls, the priority of a rule, also referred to as its rank, is based on its position within the list. Earlier occurring rules have higher rank than later ones. List-based firewalls logically examine the rules in sequential order. For each packet that the firewall receives, the first rule that matches information in the packet header determines the action taken by the firewall. This is referred to as the first hit principle.

Rule redundancy in list-based firewalls can be of two types—internal or external. For a given rule, internal redundancy occurs when at least one of its fields contains duplicate entries. Internal redundancy can also occur if there are suboptimal representations of entries within a field. For example, if one of the fields of the rule represents a network address, the appearance of the address values 192.168.1.0/24 and 192.168.0.0/24 within this same field constitutes an internal redundancy. This apparent redundancy can be removed by replacing the above address values with 192.168.0.0/23.

External redundancy between two rules occurs when one of the rules is a superset of the other one and appears earlier in the firewall rule set. This makes the second rule redundant with respect to the first one, as all traffic for which the second rule applies is filtered by the first rule. Formally, rule $R_2$ is said to be externally redundant with respect to rule $R_1$, if and only if: (i) $R_1$ is a superset of $R_2$, and $R_2$'s rank>$R_1$'s rank. Externally redundant rules can be removed without violating the semantic integrity of the security policy.

Two rules are dependent if they mutually exhibit a precedence relationship. Formally, rules $R_1$ and $R_2$ are dependent if the following conditions are satisfied: (i) $R_1$ and $R_2$ are not disjoint, (ii) $R_2$'s rank>$R_1$'s rank, and (iii) $R_1$'s action field !=$R_2$'s action field. As a consequence, if two rules $R_1$ and $R_2$ are dependent, then $R_2$ cannot be moved before $R_1$ without violating the semantic integrity of the rule set.

Two rules are said to be disjoint if they differ at least in one of their fields. Formally, rule $$R_1 = \left[\Phi_1^1, \Phi_1^2, \ldots, \Phi_1^k; \sum_1\right]$$

and rule $$R_2 = \left[\Phi_2^1, \Phi_2^2, \ldots, \Phi_2^k; \sum_2\right]$$

are disjoint if and only if there exists at least one i such as $\Phi_1^i \cap \Phi_2^i = 0$.

As described above, firewall policies of an actively managed enterprise network may change in response to new services, new threats or when the underlying network changes. The intrinsic complexity of the firewall policies typically makes it difficult to track down these changes. As a consequence, inefficiency, such as redundancies between rules and suboptimal representations of rule sets and fields within a rule, arises.

As specified above, the firewall 104 includes a traffic-aware firewall optimizer (TFO) 120. The TFO 120 dynamically optimizes the firewall 104. The TFO 120 can optimize the firewall by reordering its rules, adding new rules, splitting rules, etc. in order to make the firewall 104 more efficient. The TFO 120 optimizes the firewall 104 based on traffic characteristics, such as header information of the packets received by the firewall 104, when the usage of the processor of the firewall 104 increases, and/or when its memory consumption increases. Although shown as part of the firewall 104, the TFO 120 may be external from the firewall 104.

Figure 2:
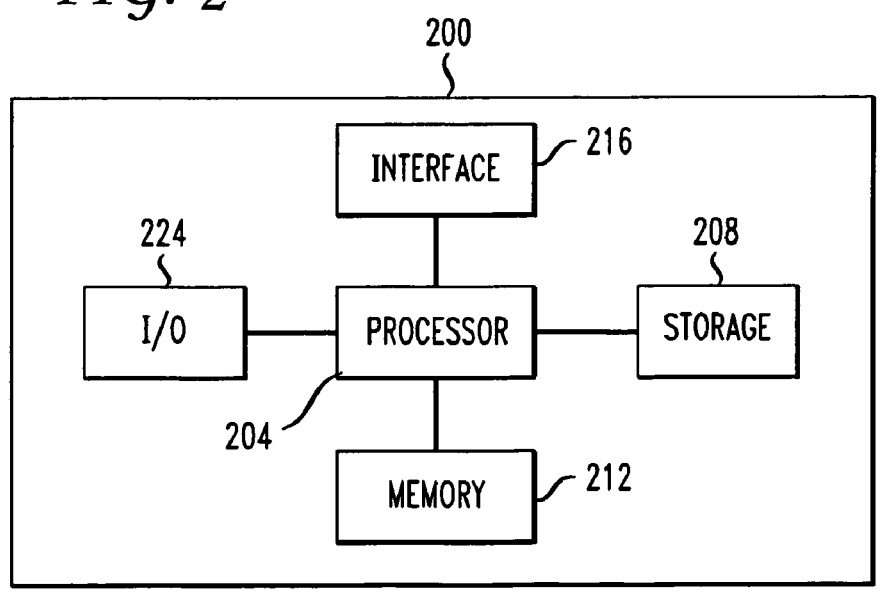
FIG. 2 is a block diagram of a high level block diagram of a computer system which may be used in an embodiment of the invention.

The previous and following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other nodes. A high level block diagram of such a computer is shown in FIG. 2. Computer 200 contains a processor 204 which controls the overall operation of computer 200 by executing computer program instructions which define such operation. The computer program instructions may be stored in a storage device 208 (e.g., magnetic disk) and loaded into memory 212 when execution of the computer program instructions is desired. Computer 200 also includes one or more interfaces 216 for communicating with other devices (e.g., locally or via a network). Computer 200 also includes a transmitter 220 for transmitting information to other devices. Computer 200 also includes input/output (I/O) 224 which represents devices which allow for user interaction with the computer 200 (e.g., display, keyboard, mouse, speakers, buttons, etc.). In one embodiment, computer 200 represents firewall 104 or TFO 120.

One skilled in the art will recognize that an implementation of an actual computer will contain other nodes as well, and that FIG. 2 is a high level representation of some of the nodes of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

In accordance with the present invention, a toolset enables acceleration of firewall operations and enables adaptation of its performance to the dynamically changing network traffic characteristics.

Figure 3:
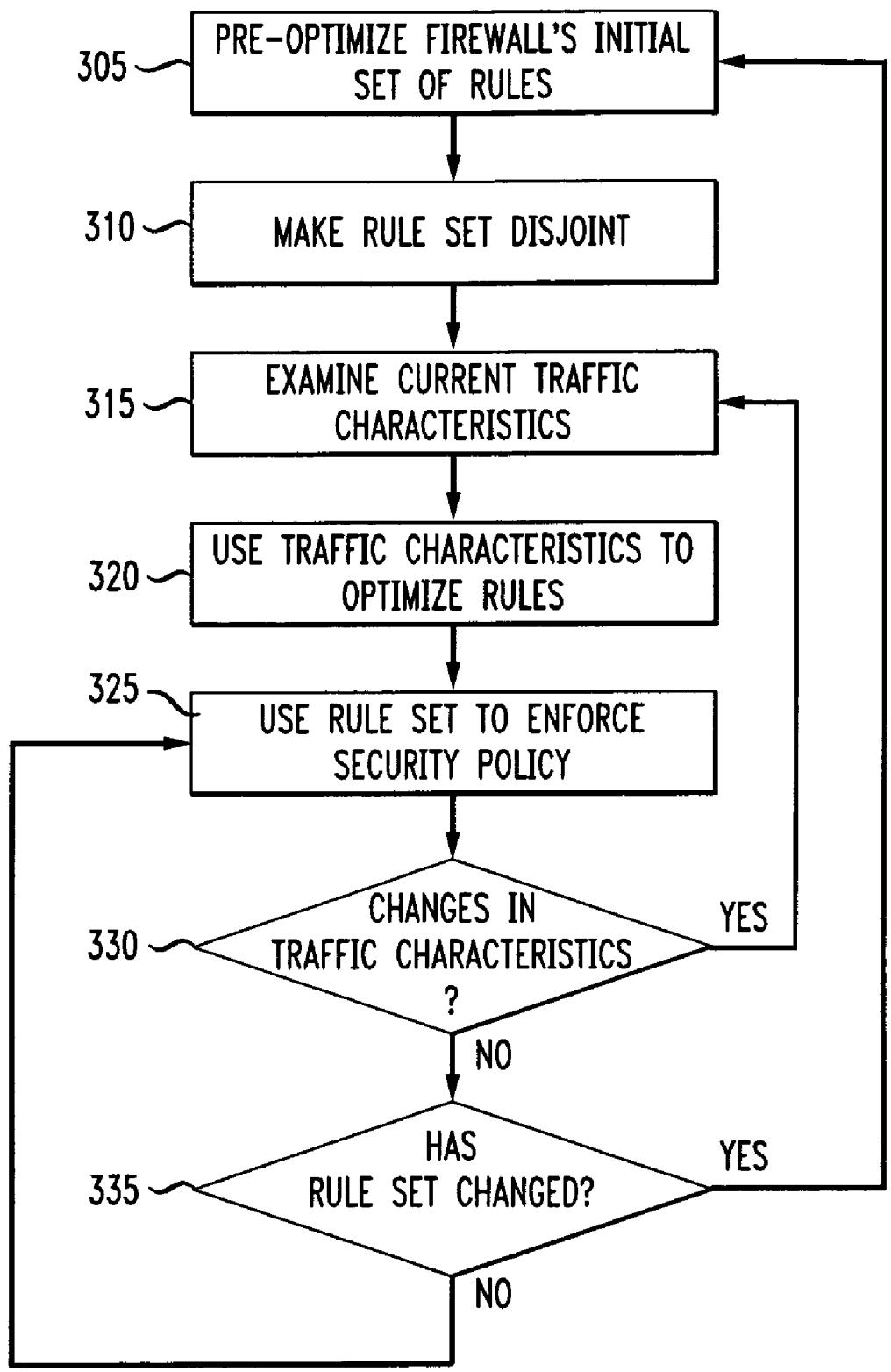
FIG. 3 is a flowchart showing the steps performed by a traffic-aware firewall optimizer to optimize a firewall in accordance with an embodiment of the invention.

FIG. 3 shows a high level flowchart of the steps performed by a traffic-aware firewall optimizer (TFO) to optimize a firewall in accordance with the invention. The TFO first pre-optimizes the firewall's initial set of rules in step 305. The pre-optimization phase removes all redundancies in the initial rule set. The TFO then makes the pre-optimized rule set disjoint in step 310. As described above, two rules are said to be disjoint if they differ at least in one of their fields.

The TFO then examines current traffic characteristics in step 315. In step 320, the TFO uses these current traffic characteristics to optimize the rule set (e.g., to determine the order in which rules in the rule set are to be invoked). The TFO then uses the rule set in step 325 to enforce the security policy associated with the firewall.

The TFO continuously checks whether (e.g., sudden) changes occur in the traffic characteristics in step 330. Changes in traffic characteristics occur when, for example, the firewall receives a predetermined number of packets having different header information relative to previous packets. If so, the process returns to step 315. If not, the TFO determines whether the rule set has changed in step 335. If the rule set has changed in step 335, the process returns to step 305 for pre-optimization. The process repeats itself with the new initial rule set. If the rule set has not changed, the firewall continues to enforce the security policy with the existing, traffic-aware optimized rule set in step 325.

Figure 4:
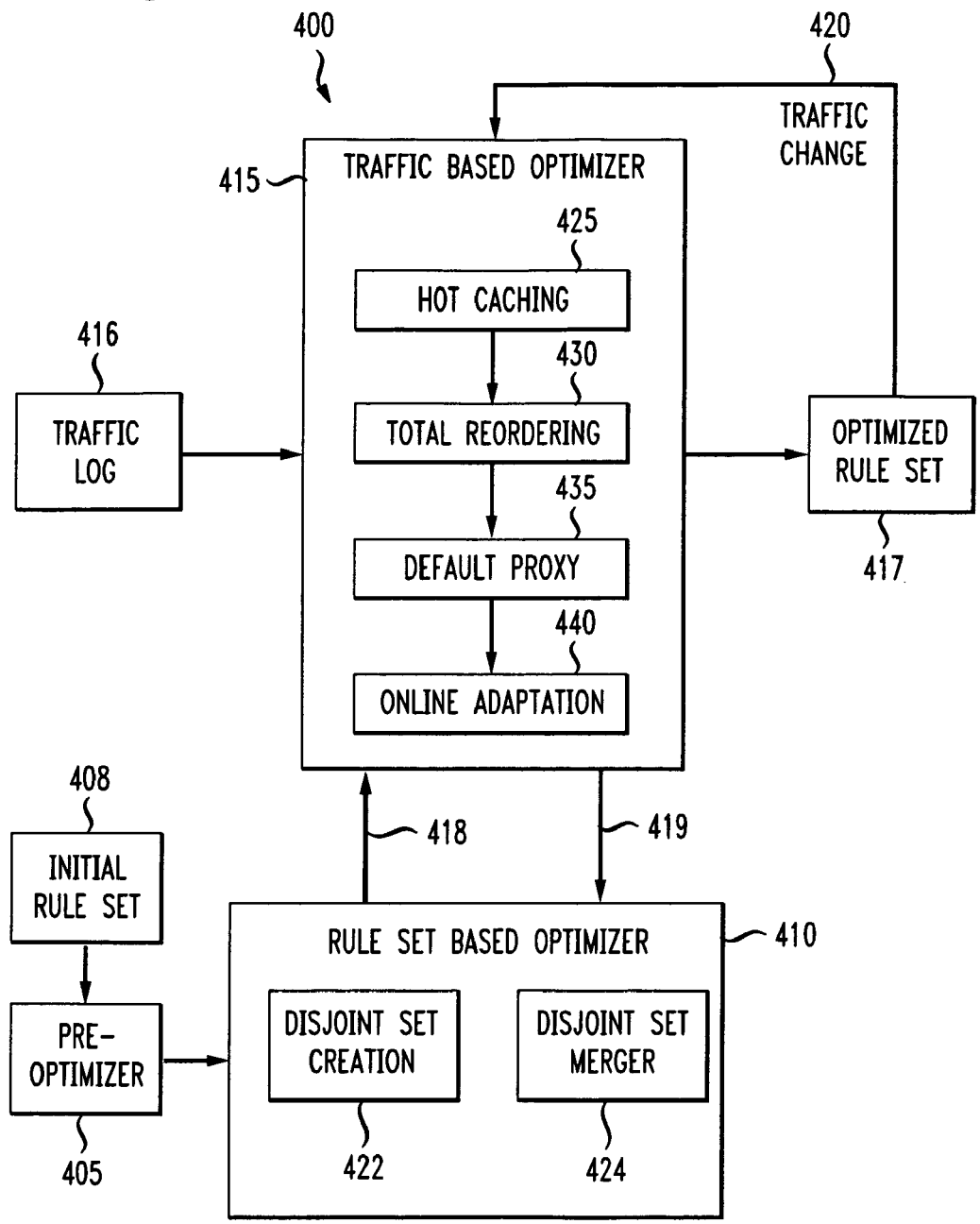
FIG. 4 is a block diagram of the traffic-aware firewall optimizer in accordance with an embodiment of the invention.

FIG. 4 is a block diagram of a traffic-aware firewall optimizer (TFO) 400 and the optimization process used to optimize an initial firewall rule set in accordance with an embodiment of the present invention. As described above, the process begins with a pre-optimization phase performed by a pre-optimizer 405. The main objective of this phase is to remove all redundancies in an initial rule set 408. At the end of this phase, internal and external redundancies in the rule set 408 are removed. Unless there is a change in the current firewall policy, the pre-optimization phase is typically performed once.

The optimization process uses a rule set based optimizer 410 and a traffic based optimizer 415. Both optimizers cooperate to adaptively optimize the rule set in response to dynamically changing traffic characteristics. This cooperation is achieved through a dynamic feedback mechanism.

The rule set based optimizer 410 operates exclusively on the rule set, with no additional consideration of other factors impacting network or traffic behavior. The rule set based optimizer 410 continuously seeks to create new definitions in order to make rules in the current rule set disjoint. This, in turn, provides the traffic based optimizer 415 with full flexibility to reorder rules based on traffic characteristics.

The rule set based optimizer 410 takes as input the pre-optimized rule set and produces a rule set based optimized set of rules. This set is then fed to the traffic based optimizer 415. Using the traffic characteristics stored in the firewall's traffic log 416, the traffic based optimizer 415 produces an optimized rule set 417 which reflects the current characteristics of the traffic without violating the semantic integrity of the initial rule set 408. The traffic-aware optimized rule set 417 is used by the firewall to enforce the security policy.

In one embodiment, this continues until changes 420 in the traffic characteristics occur. In response to the change 420, the adaptive optimization process is reinvoked using the current rule set and a new traffic-aware optimized rule set 417 is produced. This process continues iteratively (as shown with first arrow 418 and second arrow 419), until the rule set 417 is changed. When the rule set is changed, the new rule set is pre-optimized before the rule-based and traffic-based optimizers 410, 415 are invoked.

More specifically, the rule based optimizer 410 is composed of two components—the Disjoint Set Creater (DSC) 422 and the Disjoint Set Merger (DSM) 424. In one embodiment, these two components are executed sequentially. Initially, the DSC 422 detects and removes dependencies form the current rule set. The DSC 422 then creates new rule definitions (i.e., new rules) in order to make the entire rule set disjoint. This may lead to an increase in the rule set size because more rules may be needed to define each set of dependent rules.

The main task of DSM 424 is to merge the rules of the disjoint rule set produced by the DSC 422 in order to optimize the rule set representation. The merging process iteratively selects one rule and tries to merge the rule with other rules. Merging occurs between rules with the same action field, to preserve semantic integrity. Merging between two rules, with respect to a specific different field, occurs when the other corresponding field values are the same in the field space. Upon completion of this optimization step, the rule set size is reduced to its most concise representation.

In one embodiment, the rule set based optimization strategy can be reduced to rule merging only, without the creation of disjoint rules. Such an approach still results in improved rule representation, while minimizing the processing overhead. Combining disjoint set creation and merging, however, enables the optimizer 400 to effectively capture the dynamics of the traffic characteristics, thereby resulting in an optimized rule set representation.

FIG. 5 is a table 505 of a pre-optimized rule set $S_1$ and a table 510 of a disjoint rule set $S_D$. $R_2$ is dependent on $R_1$, since the source and destination fields of $R_2$ intersect with the corresponding fields of $R_1$, while the action fields of the two rules are different. These rules can be made disjoint, without violating semantic integrity. This is achieved by keeping $R_1$ unchanged and forking $R_2$ into two new rules, $R_2^1$ and $R_2^2$, resulting in the disjoint rule set, $S_D$, shown in table 510.

FIG. 6 is a table 605 showing a final rule set $S_F$. As observed from the above example, creating a new disjoint rule set increases the size of the original rule set. The new set size can be further optimized by merging rule $R_2^2$ and $R_3$ into $R_4$ to produce the final rule set $S_F$.

The traffic based optimizer 415 operates on the rule set produced by the rule set based optimizer 410. The traffic based optimizer 415 uses current traffic characteristics to determine the order in which rules in the rule set are to be invoked to optimize the operational cost of the firewall. In particular, the traffic based optimizer 415 uses four techniques to determine the order to invoke the rules in the rule set. As shown in FIG. 4, the four techniques are hot caching 425, total reordering 430, default proxy 435, and online adaptation 440.

The hot caching 425 relates to a "hot rule set". A rule is "hot" if the rule experiences a large number of traffic hits. The traffic based optimizer 415 identifies a small set of "hot" rules, relative to the original rule set, and caches these rules at the top of the rule set. This results in the traffic based optimizer 415 dealing with a large amount of traffic hits early in the inspection process, thereby reducing the overall firewall operational cost.

Unlike the hot caching technique 425, the total reordering technique 430 performs a total reordering of the rule set based on the current traffic characteristics. This reordering is achieved based on a priority assignment. A priority assignment considers not only the frequency at which the rule is invoked but also the rule size. Specifically, the priority of rule $R_i$ can be expressed as:

$$Pr(R_1) = \frac{\text{hit\_count}(R_i)}{\text{size}(R_i)}.$$

In one embodiment, ordering firewall rules based on these priorities achieves the lowest expected cost.

The default proxy technique 435 is based on the fact that, during traffic inspection, the default deny action is heavily invoked, in comparison to actions resulting from other rules. In a list-based firewall, the default deny action is "enforced" when a packet fails to match any of the rules within a rule set. A relatively high hit ratio of the default deny action is, therefore, bound to increase considerably the overall operational cost of the firewall. The main reason for this increase is that, before a default deny action is enforced and the packet is dropped, all rules in a rule set have to be examined. This is mainly caused by the absence of any representation of the default deny action in the rule set. This suggests that the addition of drop rules may alleviate the problem. Adding drop rules, however, brings about several issues to be addressed, including how many rules must be created, what values should be associated with these new reject rules and what should be their priorities.

The default proxy technique 435 addresses these issues by creating a set of reject rules. The field values of these rules are derived from the corresponding fields of the packets dropped by the default deny action. Initially, the fields of a reject rule are set to any, except for the action field which is set to drop. The reject rule can be represented as follows:

$$<\Phi^1:any;\ \Phi^2:any;\ \ldots,\ \Phi_n:any;action=drop;>$$

As packets are dropped by the default deny rule, the values of the reject rule are set to the values of corresponding fields of the dropped packets. This corresponds to the hit rate of the reject rule. The priority each newly created reject rule is computed is based on its hit rate and its size in a similar manner as in the total reordering technique 430.

The online adaptation technique 440 encompasses two mechanisms—profile based reordering and anomaly detection and countermeasure. Profile based reordering uses traffic characteristics to build a long-term rule hit profile offline. The approach used to build this profile exploits traffic variability. The resulting rule hit profile is then used to detect long and short term anomalies and adapt the rule set accordingly.

Anomaly detection and countermeasure compares the short term traffic pattern with a long term traffic profile. The latter is used to optimize the firewall rules. If a significant discrepancy exists between the short term traffic pattern and the long term profile, and this discrepancy can result in a poor predicted performance, the rules are adjusted as a countermeasure against anomalies. Adjusting the rules entails rule re-ordering and adding explicit reject rules.

Anomalies can be either transient or long-lived. If the anomaly analysis reveals a potential performance hazard, a temporary reordering of rules is performed. If a given anomaly occurs consistently, then it is absorbed into the long term offline profile. The same anomaly detection and countermeasure procedure is also applied to the default deny rule. Depending on any potential performance hazard created by a default deny rule, a temporary default deny rule is added to the short term profile. If the pattern is repetitive, then the new default deny rule is added to the rule set based on its priority and hence absorbed into the long term profile.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for optimizing a set of rules associated with a firewall security policy, the method comprising:
    examining stored characteristics associated with network traffic monitored by a firewall;
    determining rule invocation of one or more rules in a first set of rules, with respect to the network traffic, the first set of rules being associated with a firewall security policy;
    automatically generating a second set of rules based on the rule invocation, by at least performing an online adaptation technique, wherein performing the online adaptation technique further comprises:
        generating a long-term rule hit profile based on traffic variability;
        comparing a short-term traffic pattern with the long-term rule hit profile; and
        generating the second set of rules when a discrepancy is detected between the short-term traffic pattern and the long-term rule hit profile; and
    enforcing the firewall security policy, based on the second set of rules.

2. The method of claim 1 wherein the step of enforcing the firewall security policy further comprises enforcing, by the firewall, the second set of rules on the network traffic.

3. The method of claim 1 further comprising removing redundancies in the first set of rules.

4. The method of claim 1 further comprising generating a disjoint rule set from the first set of rules.

5. The method of claim 4 further comprising removing dependencies from the first set of rules.

6. The method of claim 5 further comprising creating new rules.

7. The method of claim 4 further comprising merging rules to generate a rule set based optimized set of rules.

8. The method of claim 1 wherein performing the online adaptation technique further comprises performing at least one of profile based reordering and anomaly detection and countermeasure.

9. The method of claim 1 wherein the second set of rules has a different order than the first set of rules.

10. A firewall enforcing a set of rules associated with a firewall security policy, the firewall comprising:
    a traffic based optimizer configured to:
        examine stored characteristics associated with network traffic monitored by the firewall;
        determine rule invocation of one or more rules in a first set of rules with respect to the network traffic, the first set of rules being associated with a firewall security policy; and
        automatically generate a second set of rules based on the rule invocation, by at least performing an online adaptation technique comprising generating a long-term rule hit profile based on traffic variability, comparing a short-term traffic pattern with the long-term rule hit profile, and generating the second set of rules when a discrepancy is detected between the short-term traffic pattern and the long-term rule hit profile;
    the firewall configured to enforce the firewall security policy, based on the second set of rules.

11. The firewall of claim 10 further comprising a rule set based optimizer configured to remove redundancies in the first set of rules.

12. The firewall of claim 10 further comprising a rule set based optimizer configured to generate a disjoint rule set from the first set of rules.

13. The firewall of claim 12 wherein the rule set based optimizer is configured to remove dependencies from the first set of rules.

14. The firewall of claim 12 wherein the rule set based optimizer is configured to create new rules.

15. The firewall of claim 12 wherein the rule set based optimizer is configured to merge rules to generate a rule set based optimized set of rules.

16. The firewall of claim 15 wherein traffic based optimizer is configured to perform at least one of profile based reordering and anomaly detection and countermeasure on the rule set based optimized set of rules to generate the second set of rules.

17. The firewall of claim 10 wherein the first set of rules has a different order than the second set of rules.

18. A firewall enforcing a set of rules associated with a firewall security policy, the firewall comprising:

means for examining stored characteristics associated with network traffic monitored by the firewall;

means for determining rule invocation of one or more rules in a first set of rules with respect to the network traffic, the first set of rules being associated with a firewall security policy;

means for automatically generating a second set of rules based on the rule invocation, by at least performing an online adaptation technique, wherein the means for performing an online adaptation technique further comprises:

means for generating a long-term rule hit profile based on traffic variability;

means for comparing a short-term traffic pattern with the long-term rule hit profile; and means for generating the second set of rules when a discrepancy is detected between the short-term traffic pattern and the long-term rule hit profile; and means for enforcing the firewall security policy, based on the second set of rules.

19. The firewall of claim 18 further comprising means for removing redundancies in the first set of rules.

20. The firewall of claim 18 further comprising means for generating a disjoint rule set from the first set of rules.

21. The firewall of claim 20 further comprising means for removing dependencies from the first set of rules.

22. The firewall of claim 21 further comprising means for creating new rules.

23. The firewall of claim 20 further comprising means for merging rules to generate a rule set based optimized set of rules.

24. The firewall of claim 18 wherein the means for performing the online adaptation technique further comprises means for performing at least one of profile based reordering and anomaly detection and countermeasure.

* * * * *